United States Patent
Huang et al.

(10) Patent No.: US 12,133,305 B2
(45) Date of Patent: Oct. 29, 2024

(54) FLOATING TYPE BOOST-BUCK PFC CIRCUIT AND LED DRIVE POWER SUPPLY

(71) Applicant: SHENZHEN FAHOLD ELECTRONIC LIMITED, Shenzhen (CN)

(72) Inventors: Huiteng Huang, Shenzhen (CN); Zhuanhong Wu, Shenzhen (CN); Jiafei Lin, Shenzhen (CN)

(73) Assignee: SHENZHEN FAHOLD ELECTRONIC LIMITED, Shenzhen (CN)

( * ) Notice: Subject to any disclaimer, the term of this patent is extended or adjusted under 35 U.S.C. 154(b) by 0 days.

(21) Appl. No.: 18/016,722

(22) PCT Filed: Oct. 20, 2021

(86) PCT No.: PCT/CN2021/124981
§ 371 (c)(1),
(2) Date: Jan. 18, 2023

(87) PCT Pub. No.: WO2022/127351
PCT Pub. Date: Jun. 23, 2022

(65) Prior Publication Data
US 2023/0309206 A1     Sep. 28, 2023

(30) Foreign Application Priority Data
Dec. 14, 2020  (CN) .................. 202011466824.X

(51) Int. Cl.
*H05B 45/30*     (2020.01)
*H02M 1/42*      (2007.01)
(Continued)

(52) U.S. Cl.
CPC ........ *H05B 45/355* (2020.01); *H02M 1/4233* (2013.01); *H02M 3/1582* (2013.01); *H05B 45/375* (2020.01); *H05B 45/38* (2020.01)

(58) Field of Classification Search
CPC .... H05B 45/38; H05B 45/355; H05B 45/375; H05B 45/385; H05B 45/3725;
(Continued)

(56) References Cited

U.S. PATENT DOCUMENTS 7,425,803 B2 *  9/2008  Shao ............... H05B 31/50
                                                  315/308
8,619,442 B2 * 12/2013  Wrathall .......... G05F 1/70
                                                   327/330

(Continued)

FOREIGN PATENT DOCUMENTS

CN    103716952 A    4/2014
CN    204069441 A   12/2014
(Continued)

OTHER PUBLICATIONS

ISR of PCT/CN2021/124981.

*Primary Examiner* — Tung X Le
(74) *Attorney, Agent, or Firm* — Hemisphere Law, PLLC; Zhigang Ma

(57) ABSTRACT

The present disclosure relates to a floating type boost-buck power factor correction (PFC) circuit and a light-emitting diode (LED) drive power supply. The floating type boost-buck PFC circuit includes a filter circuit, a rectifier bridge, a PFC control chip and a voltage sampling circuit, and further includes a PFC circuit; the PFC circuit includes a switching transistor Q1 and switching transistor Q2 with a withstand voltage of 600 V to 650 V, an energy storage inductor T1, a freewheel diode D0, a freewheel diode D1, an electrolytic capacitor E1 with a withstand voltage of 400 V to 450 V, a resistor R0 and a capacitor C1. The LED drive
(Continued)

power supply includes a DC/DC conversion circuit, an LLC control chip, an LED voltage/current sampling circuit, and the above floating type boost-buck PFC circuit. Compared with the traditional PFC circuit, the floating type boost-buck PFC circuit provided by the present disclosure has the characteristics of simple circuit, a small number of devices, high conversion efficiency, higher stability and lower product cost.

9 Claims, 2 Drawing Sheets

(51) Int. Cl.
  *H02M 3/158* (2006.01)
  *H05B 45/355* (2020.01)
  *H05B 45/375* (2020.01)
  *H05B 45/38* (2020.01)
(58) Field of Classification Search
  CPC .. H02M 1/007; H02M 1/4208; H02M 1/4233; H02M 3/1582; H02M 3/33523; H02M 3/33569
  See application file for complete search history.

(56) References Cited

U.S. PATENT DOCUMENTS

| | | | | |
|---|---|---|---|---|
| 8,884,548 | B2* | 11/2014 | Martin-Lopez | H05B 45/3725 |
| | | | | 315/308 |
| 8,970,136 | B2* | 3/2015 | Kikuchi | H05B 45/375 |
| | | | | 315/308 |
| 11,824,433 | B2* | 11/2023 | Neudorf | H02M 1/0058 |
| 2012/0250360 | A1* | 10/2012 | Orr | H02M 3/3376 |
| | | | | 363/21.02 |
| 2015/0349624 | A1* | 12/2015 | Wang | H02M 1/4225 |
| | | | | 363/21.09 |
| 2020/0068680 | A1* | 2/2020 | Neudorf | H05B 45/37 |
| 2022/0201817 | A1* | 6/2022 | Zhou | H05B 45/31 |

FOREIGN PATENT DOCUMENTS

| | | |
|---|---|---|
| CN | 106533194 A | 3/2017 |
| CN | 206498565 A | 9/2017 |
| CN | 112367748 | 2/2021 |
| JP | 2011250600 A | 12/2011 |
| KR | 20100073728 A | 7/2010 |

\* cited by examiner

FLOATING TYPE BOOST-BUCK PFC CIRCUIT AND LED DRIVE POWER SUPPLY

TECHNICAL FIELD

The present disclosure relates to the technical field of power electronics, in particular to a floating type boost-buck power factor correction (PFC) circuit and a light-emitting diode (LED) drive power supply.

BACKGROUND

Generally, a direct current voltage obtained by rectifying, by a rectifier bridge, a voltage of 480 Vac input by a power grid is close to 680 V (480×1.414). Considering 10% margin of conventional design, a working direct current voltage of a circuit will be close to 750 V. The requirements for capacitor life and ripple current are met. At present, the technical bottleneck of a commercial single electrolytic capacitor is that a working voltage is less than 600 V. It is common practice to connect a plurality of capacitors of the specification of 400 V to 450 V in series and parallel, which will lead to high cost and large volume. In addition, the voltage of a required semiconductor switching transistor also needs to be raised from 600 V to 650 V to a level of 900 V to 1 KV, resulting in higher cost.

SUMMARY

The technical problem to be solved in the present disclosure is to provide a floating type boost-buck PFC circuit and an LED drive power supply, in which, the number of devices used is small and the cost is low.

In order to achieve the objective of the present disclosure, the present disclosure adopts the following technical solution:

A floating type boost-buck PFC circuit includes a filter circuit, a rectifier bridge, a PFC control chip and a voltage sampling circuit, and further includes a PFC circuit, wherein the PFC circuit includes a switching transistor Q1 and switching transistor Q2 with a withstand voltage of 600 V to 650 V, an energy storage inductor T1, a freewheel diode D0, a freewheel diode D1, an electrolytic capacitor E1 with a withstand voltage of 400 V to 450 V, a resistor R0 and a capacitor C1.

An external alternating current voltage is connected to an input end of the rectifier bridge through the filter circuit; a positive output end of the rectifier bridge is respectively connected with a drain of the switching transistor Q1 and one end of the capacitor C1; a source of the switching transistor Q1 is respectively connected with one input end of the energy storage inductor T1 and one end of the electrolytic capacitor E1; one end of the electrolytic capacitor E1 is grounded; one output end in the energy storage inductor T1 is respectively connected with a positive pole of the freewheel diode D0 and a drain of the switching transistor Q2; a negative pole of the freewheel diode D0 is connected with the other end of the electrolytic capacitor E1 through the freewheel diode D1; the other end of the electrolytic capacitor E1 is connected with an input end of the voltage sampling circuit; an output end of the voltage sampling circuit is connected with an input end of the PFC control chip through an optically coupled isolator U1; and an output end of the PFC control chip is connected with a primary coil in an isolated drive winding TO.

A source of the switching transistor Q2 is connected with one end of the resistor R0; a gate of the switching transistor Q2 is connected with one end of a first secondary coil in the isolated drive winding TO through a resistor R2; the other end of the first secondary coil in the isolated drive winding TO is connected with the other end of the resistor R0; a gate of the switching transistor Q1 is connected with one end of a second secondary coil in the isolated drive winding TO through a resistor R1; and the other end of the second secondary coil in the isolated drive winding TO, the other end of the resistor R0, the other input end in the energy storage inductor T1 and the other end of the capacitor C1 are all grounded.

Compared with the traditional PFC circuit, the floating type boost-buck PFC circuit provided by the present disclosure outputs a direct current voltage of 400 Vdc (adjustable) after rectifying, filtering and correcting a voltage of 480 Vac input by a power grid, during which, only the single conventional electrolytic capacitor E1 with a withstand voltage of 400 V to 450 V and the conventional semiconductor switching transistors Q1 and Q2 with a withstand voltage of 600 V to 650 V are used, which can also meet the international and domestic product standards. The floating type boost-buck PFC circuit has the characteristics of simple circuit, a small number of devices, high conversion efficiency, higher stability and lower product cost.

In one embodiment, the PFC circuit further includes a pressure-sensitive device MOV1 and a pressure-sensitive device MOV2; the pressure-sensitive device MOV1 is connected in parallel between the source and drain of the switching transistor Q1; one end of the pressure-sensitive device MOV2 is connected with the other end of the electrolytic capacitor E1; and the other end of the pressure-sensitive device MOV2 is grounded.

In one embodiment, the PFC control chip adopts a CRM mode PFC chip L6562NCL2801.

In one embodiment, the filter circuit includes a capacitor CX1, a common mode choke LF1, a capacitor Y1 and a capacitor Y2; an L end of the external alternating current voltage is respectively connected with a first end of the capacitor CX1 and one input end of the common mode choke LF1; one output end of the common mode choke LF1 is respectively connected with a first end of the capacitor Y1 and a positive input end of the rectifier bridge; an N end of the external alternating current voltage is respectively connected with a second end of the capacitor CX1 and the other input end of the common mode choke LF1; and the other output end of the common mode choke LF1 is respectively connected with a first end of the capacitor Y2 and a negative input end of the rectifier bridge.

In one embodiment, the voltage sampling circuit adopts a resistive voltage sampling circuit; and the optically coupled isolator U1 adopts an optically coupled isolator OPTOISO1.

In order to achieve the objective of the present disclosure, the present disclosure also provides the following technical solution:

An LED drive power supply includes a DC/DC conversion circuit, an LLC control chip, an LED voltage/current sampling circuit, and the above floating type boost-buck PFC circuit, wherein one input end of the DC/DC conversion circuit is connected with the other end of the electrolytic capacitor E1; an output end of the DC/DC conversion circuit is respectively connected with a power end of an LED lamp source array and an input end of the LED voltage/current sampling circuit; an output end of the LED voltage/current sampling circuit is connected with an input end of the LLC control chip through an optically coupled isolator U2; and an output end of the LLC control chip is connected with the other input end of the DC/DC conversion circuit.

In one embodiment, the DC/DC conversion circuit includes a switching transistor Q3, a switching transistor Q4, a capacitor C0, an adjustment winding T2 and an electrolytic capacitor E2; one end of the electrolytic capacitor E1 is respectively connected with a drain of the switching transistor Q3 and one end of a first primary coil in the adjustment winding T2; the other end of the first primary coil in the adjustment winding T2 is connected with one end of the capacitor C0; the other end of the capacitor C0 is connected with a source of the switching transistor Q3; a gate of the switching transistor Q3 is connected with an output end OUT1 of the LLC control chip through a resistor R9; the other end of the electrolytic capacitor E1 is connected with a drain of the switching transistor Q4; a source of the switching transistor Q4 is respectively connected with the other end of the capacitor C0 and an output end OUT2 of the LLC control chip; a gate of the switching transistor Q4 is connected with an output end OUT3 of the LLC control chip through a resistor R10; one end of a second primary coil in the adjustment winding T2 is connected with a positive pole of a diode D6; the other end of the second primary coil in the adjustment winding T2 is connected with one end of the capacitor C2; and a negative pole of the diode D6 and the other end of the capacitor C2 are respectively connected with a power end.

One end of a first secondary coil in the adjustment winding T2 is connected with a positive pole of a diode D4; the other end of the first secondary coil in the adjustment winding T2 is connected with a positive pole of a diode D5; an adjustment end of the first secondary coil in the adjustment winding T2 is connected with one end of the electrolytic capacitor E2; the other end of the electrolytic capacitor E2 is respectively connected with a negative pole of the diode D4 and a negative pole of the diode D5; a positive power input end of the LED lamp source array is connected with the other end of the electrolytic capacitor E2; and a negative power input end of the LED lamp source array is connected with one end of the electrolytic capacitor E2.

In one embodiment, the LLC control chip adopts an LLC control chip L6599NCP1399.

In one embodiment, the LED voltage/current sampling circuit adopts an operational amplification type voltage/current sampling circuit; and the optically coupled isolator U2 adopts an optically coupled isolator OPTOISO1.

DETAILED DESCRIPTION OF THE EMBODIMENTS

Figure 1:
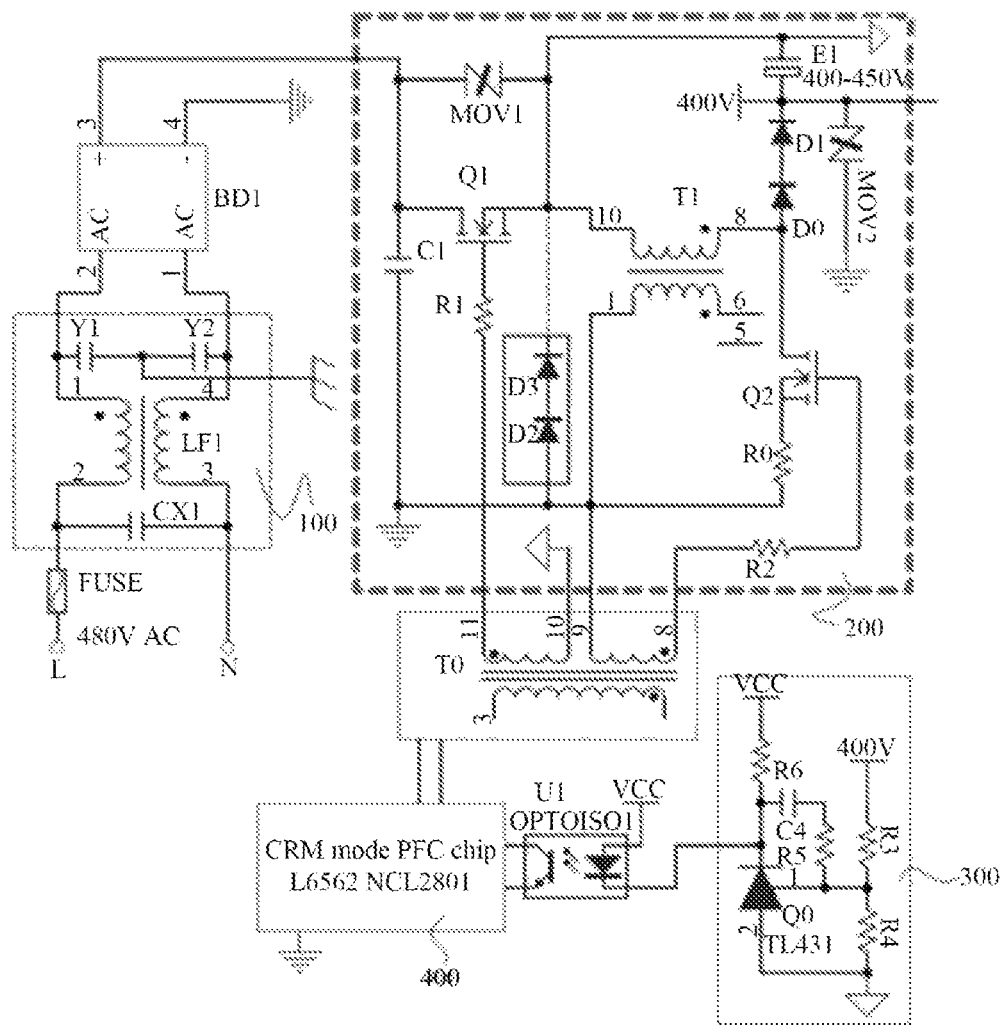
FIG. 1 is a schematic diagram of a circuit principle of a floating type boost-buck PFC circuit in one embodiment.

In order to facilitate an understanding of the prevent invention, the present disclosure will be described more comprehensively below with reference to related accompanying drawings. Preferred embodiments of the present disclosure are illustrated in the drawings. However, the present disclosure can be embodied in many different forms, and is not limited to the embodiments described herein. Rather, these embodiments are provided so that the disclosed content of the present disclosure will be more thorough and complete.

Unless otherwise defined, all technical and scientific terms used herein are the same as meanings of general understandings of those skilled in the art of the present disclosure. The terms used in the description of the present disclosure herein are merely to describe the specific embodiments, not intended to limit the present disclosure.

In addition, the terms "first" and "second" are used for descriptive purposes only and are not to be understood to indicate or imply relative importance or to imply the number of indicated technical features. Therefore, features defined by "first" and "second" can explicitly instruct or impliedly include at least one feature.

Referring to FIG. 1, the present disclosure provides a floating type boost-buck PFC circuit includes a filter circuit 100, a rectifier bridge BD1, a PFC control chip 400 and a voltage sampling circuit 300, and further includes a PFC circuit 200. The PFC circuit 200 includes a switching transistor Q1 and switching transistor Q2 with a withstand voltage of 600 V to 650 V, an energy storage inductor T1, a freewheel diode D0, a freewheel diode D1, an electrolytic capacitor E1 with a withstand voltage of 400 V to 450 V, a resistor R0 and a capacitor C1.

An external alternating current voltage is connected to an input end of the rectifier bridge BD1 through the filter circuit 100; a positive output end of the rectifier bridge BD1 is respectively connected with a drain of the switching transistor Q1 and one end of the capacitor C1; a source of the switching transistor Q1 is respectively connected with one input end of the energy storage inductor T1 and one end of the electrolytic capacitor E1; one end of the electrolytic capacitor E1 is grounded; one output end in the energy storage inductor T1 is respectively connected with a positive pole of the freewheel diode D0 and a drain of the switching transistor Q2; a negative pole of the freewheel diode D0 is connected with the other end of the electrolytic capacitor E1 through the freewheel diode D1; the other end of the electrolytic capacitor E1 is connected with an input end of the voltage sampling circuit 300; an output end of the voltage sampling circuit 300 is connected with an input end of the PFC control chip 400 through an optically coupled isolator U1; and an output end of the PFC control chip 400 is connected with a primary coil in an isolated drive winding T0.

A source of the switching transistor Q2 is connected with one end of the resistor R0; a gate of the switching transistor Q2 is connected with one end of a first secondary coil in the isolated drive winding T0 through a resistor R2; the other end of the first secondary coil in the isolated drive winding T0 is connected with the other end of the resistor R0; a gate of the switching transistor Q1 is connected with one end of a second secondary coil in the isolated drive winding T0 through a resistor R1; and the other end of the second secondary coil in the isolated drive winding T0, the other end of the resistor R0, the other input end in the energy storage inductor T1 and the other end of the capacitor C1 are all grounded.

Specifically, the PFC control chip 400 adopts a CRM mode PFC chip L6562NCL2801. The filter circuit 100 adopts an EMI filter circuit. The EMI filter circuit may include a capacitor CX1, a common mode choke LF1, a capacitor Y1 and a capacitor Y2; an L end of the external alternating current voltage is respectively connected with a first end of the capacitor CX1 and one input end of the common mode choke LF1; one output end of the common mode choke LF1 is respectively connected with a first end of the capacitor Y1 and a positive input end of the rectifier bridge BD1; an N end of the external alternating current voltage is respectively connected with a second end of the capacitor CX1 and the other input end of the common mode choke LF1; and the other output end of the common mode choke LF1 is respectively connected with a first end of the capacitor Y2 and a negative input end of the rectifier bridge BD1. The voltage sampling circuit 300 may adopt a resistive voltage sampling circuit; and the optically coupled isolator U1 adopts an optically coupled isolator OPTOISO1.

Further, the PFC circuit 200 further includes a pressure-sensitive device MOV1 and a pressure-sensitive device MOV2; the pressure-sensitive device MOV1 is connected in parallel between the source and drain of the switching transistor Q1; one end of the pressure-sensitive device MOV2 is connected with the other end of the electrolytic capacitor E1; and the other end of the pressure-sensitive device MOV2 is grounded.

This embodiment mainly adopts an implementation method, i.e. a voltage drop method of the PFC circuit 200. A lower working voltage (which is 400 V of this circuit) is provided for the later stage while an active PFC function is realized. In a circuit diagram, the PFC circuit is composed of two switching transistors Q1 and Q2 with 600 V to 650 V, an energy storage inductor T1 (with a switch zero crossing point detection winding), a freewheel diode D0/D1 and a single electrolytic capacitor E1 with 400 V to 450 V. After being isolated by the optically coupled isolator U1, a voltage output by the PFC circuit 200 is transmitted to the PFC control chip 400. The switching transistors Q1 and Q2 are controlled to be turned on and turned off by magnetic field isolation. The pressure-sensitive devices MOV1 and MOV2 perform surge protection. A difference of the key technical point of this embodiment lies in the use of the traditional diode D2/D3 (the diode D2/D3 is not used in this embodiment). The negative pole of the electrolytic capacitor E1 is not connected with the negative pole of the rectifier bridge BD1, so as to avoid a voltage drop and switching loss of D2/D3, which reduces the number of devices and improves the power conversion efficiency and reliability.

Compared with the traditional PFC circuit, the floating type boost-buck PFC circuit provided by this embodiment outputs a direct current voltage of 400 Vdc (adjustable) after rectifying, filtering and correcting a voltage of 480 Vac input by a power grid, during which, only the single conventional electrolytic capacitor E1 with a withstand voltage of 400 V to 450 V and the conventional semiconductor switching transistors Q1 and Q2 with a withstand voltage of 600 V to 650 V are used, which can also meet the international and domestic product standards. The floating type boost-buck PFC circuit has the characteristics of simple circuit, a small number of devices, high conversion efficiency, higher stability and lower product cost.

Figure 2:
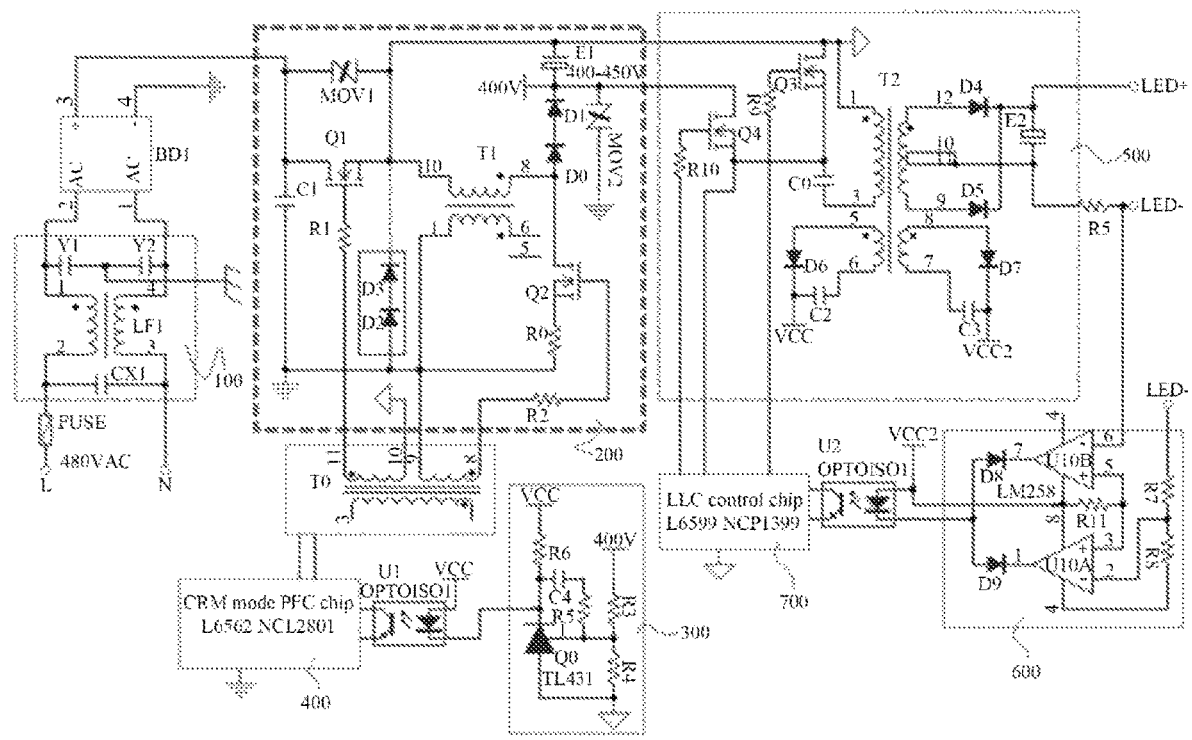
FIG. 2 is a schematic diagram of a circuit principle of an LED drive power supply in one embodiment.

Referring to FIG. 2, the present disclosure further provides an LED drive power supply, including a DC/DC conversion circuit 500, an LLC control chip 700, an LED voltage/current sampling circuit 600, and the above floating type boost-buck PFC circuit. One input end of the DC/DC conversion circuit 500 is connected with the other end of the electrolytic capacitor E1; an output end of the DC/DC conversion circuit 500 is respectively connected with a power end of an LED lamp source array and an input end of the LED voltage/current sampling circuit 600; an output end of the LED voltage/current sampling circuit 600 is connected with an input end of the LLC control chip 700 through an optically coupled isolator U2; and an output end of the LLC control chip 700 is connected with the other input end of the DC/DC conversion circuit 500.

Specifically, the DC/DC conversion circuit 500 may include a switching transistor Q3, a switching transistor Q4, a capacitor C0, an adjustment winding T2 and an electrolytic capacitor E2; one end of the electrolytic capacitor E1 is respectively connected with a drain of the switching transistor Q3 and one end of a first primary coil in the adjustment winding T2; the other end of the first primary coil in the adjustment winding T2 is connected with one end of the capacitor C0; the other end of the capacitor C0 is connected with a source of the switching transistor Q3; a gate of the switching transistor Q3 is connected with an output end OUT1 of the LLC control chip 700 through a resistor R9; the other end of the electrolytic capacitor E1 is connected with a drain of the switching transistor Q4; a source of the switching transistor Q4 is respectively connected with the other end of the capacitor C0 and an output end OUT2 of the LLC control chip 700; a gate of the switching transistor Q4 is connected with an output end OUT3 of the LLC control chip 700 through a resistor R10; one end of a second primary coil in the adjustment winding T2 is connected with a positive pole of a diode D6; the other end of the second primary coil in the adjustment winding T2 is connected with one end of the capacitor C2; and a negative pole of the diode D6 and the other end of the capacitor C2 are respectively connected with a power end. One end of a first secondary coil in the adjustment winding T2 is connected with a positive pole of a diode D4; the other end of the first secondary coil in the adjustment winding T2 is connected with a positive pole of a diode D5; an adjustment end of the first secondary coil in the adjustment winding T2 is connected with one end of the electrolytic capacitor E2; the other end of the electrolytic capacitor E2 is respectively connected with a negative pole of the diode D4 and a negative pole of the diode D5; a positive power input end of the LED lamp source array is connected with the other end of the electrolytic capacitor E2; and a negative power input end of the LED lamp source array is connected with one end of the electrolytic capacitor E2.

The LLC control chip 700 adopts an LLC control chip L6599NCP1399. The LED voltage/current sampling circuit 600 adopts an operational amplification type voltage/current sampling circuit, i.e. including a operational amplifier U10A and an operational amplifier U10B; and the optically coupled isolator U2 adopts an optically coupled isolator OPTOISO1.

The working principle of the LED drive power supply provided by this embodiment is as follows: Grid alternating current passes through the filter circuit 100 to filter out noise waves in the grid and reduce external electromagnetic interference. The rectifier bridge BD1 rectifies the grid voltage into a direct current voltage. A stable direct current voltage is obtained via the PFC circuit 200, and a pulse width-adjustable voltage is then output via the DC/DC conversion circuit 500 in the later stage. The direct current voltage is output by the diode D4/D5 to the LED lamp source array to supply power to the LED lamp source array. The voltage/current output by the power supply is controlled by a feedback signal of the operational amplifier U10A/U10B.

The optically coupled isolator U1/U2 and the isolated drive winding TO complete isolation of strong current and a control signal, so that the LLC control chip 700 and the DC/DC conversion circuit 500 are isolated, which improves the stability of a drive circuit. The LED voltage/current sampling circuit 600 collects the voltage/current of the LED lamp source array in real time and feeds it back to the LLC control chip 700. The LLC control chip 700 adjusts an output pulse width modulation (PWM) signal in real time to change a working state of a lamp in real time.

The technical features of the embodiments described above can be arbitrarily combined. In order to make the description concise, all possible combinations of various technical features in the above embodiments are not completely described. However, the combinations of these technical features should be considered as the scope described in this specification as long as there is no contradiction in them.

The above-mentioned embodiments only express several implementation modes of the present disclosure, and their descriptions are more specific and detailed, but they cannot be understood as limiting the patent scope of the present disclosure. It should be noted that those of ordinary skill in the art can further make various transformations and improvements without departing from the concept of the present disclosure, and these transformations and improvements all fall within the protection scope of the present disclosure. Therefore, the protection scope of the patent of the present disclosure shall be subject to the appended claims.

What is claimed is:

1. A floating type boost-buck power factor correction (PFC) circuit, comprising a filter circuit, a rectifier bridge, a PFC control chip and a voltage sampling circuit, and further comprising a PFC circuit, wherein the PFC circuit comprises a first switching transistor (Q1) and a second switching transistor (Q2) with a withstand voltage of 600 V to 650 V, an energy storage inductor (T1), a freewheel diode (D0), a freewheel diode (D1), an electrolytic capacitor (E1) with a withstand voltage of 400 V to 450 V, a resistor (R0) and a capacitor (C1), wherein
  an external alternating current voltage is connected to an input end of the rectifier bridge through the filter circuit; a positive output end of the rectifier bridge is respectively connected with a drain of the first switching transistor (Q1) and one end of the capacitor (C1); a source of the first switching transistor (Q1) is respectively connected with one input end of the energy storage inductor (T1) and one end of the electrolytic capacitor (E1); one end of the electrolytic capacitor (E1) is grounded; one output end in the energy storage inductor (T1) is respectively connected with a positive pole of the freewheel diode (D0) and a drain of the second switching transistor (Q2); a negative pole of the freewheel diode (D0) is connected with the other end of the electrolytic capacitor (E1) through the freewheel diode (D1); the other end of the electrolytic capacitor (E1) is connected with an input end of the voltage sampling circuit; an output end of the voltage sampling circuit is connected with an input end of the PFC control chip through an optically coupled isolator (U1); an output end of the PFC control chip is connected with a primary coil in an isolated drive winding (T0);
  a source of the second switching transistor (Q2) is connected with one end of the resistor (R0); a gate of the second switching transistor (Q2) is connected with one end of a first secondary coil in the isolated drive winding (T0) through a resistor (R2); the other end of the first secondary coil in the isolated drive winding (T0) is connected with the other end of the resistor (R0); a gate of the switching transistor (Q1) is connected with one end of a second secondary coil in the isolated drive winding (T0) through a resistor (R1); and the other end of the second secondary coil in the isolated drive winding (T0), the other end of the resistor (R0), the other input end in the energy storage inductor (T1) and the other end of the capacitor (C1) are all grounded.

2. The floating type boost-buck PFC circuit according to claim 1, wherein the PFC circuit further comprises a first pressure-sensitive device (MOV1) and a second pressure-sensitive device (MOV2); the first pressure-sensitive device (MOV1) is connected in parallel between the source and drain of the first switching transistor (Q1); one end of the second pressure-sensitive device (MOV2) is connected with the other end of the electrolytic capacitor (E1); and the other end of the second pressure-sensitive device (MOV2) is grounded.

3. The floating type boost-buck PFC circuit according to claim 1, wherein the PFC control chip adopts a CRM (Customer Relationship Management) mode PFC chip (L6562NCL2801).

4. The floating type boost-buck PFC circuit according to claim 1, wherein the filter circuit comprises a capacitor (CX1), a common mode choke (LF1), a capacitor (Y1) and a capacitor (Y2); an L end of the external alternating current voltage is respectively connected with a first end of the capacitor (CX1) and one input end of the common mode choke (LF1); one output end of the common mode choke (LF1) is respectively connected with a first end of the capacitor (Y1) and a positive input end of the rectifier bridge; an N end of the external alternating current voltage is respectively connected with a second end of the capacitor (CX1) and the other input end of the common mode choke (LF1); and the other output end of the common mode choke (LF1) is respectively connected with a first end of the capacitor (Y2) and a negative input end of the rectifier bridge.

5. The floating type boost-buck PFC circuit according to claim 1, wherein the voltage sampling circuit adopts a resistive voltage sampling circuit; and the optically coupled isolator (U1) adopts an optically coupled isolator (OPTOISO1).

6. A light-emitting diode (LED) drive power supply, comprising a DC/DC conversion circuit, an LLC (Logic Link Control) control chip, an LED voltage/current sampling circuit, and the floating type boost-buck PFC circuit according to any one of claims 1 to 5, wherein one input end of the DC/DC conversion circuit is connected with the other end of the electrolytic capacitor (E1); an output end of the DC/DC conversion circuit is respectively connected with a power end of an LED lamp source array and an input end of the LED voltage/current sampling circuit; an output end of the LED voltage/current sampling circuit is connected with an input end of the LLC control chip through an optically coupled isolator (U2); and an output end of the LLC control chip is connected with the other input end of the DC/DC conversion circuit.

7. The LED drive power supply according to claim 6, wherein the DC/DC conversion circuit comprises a third switching transistor (Q3), a fourth switching transistor (Q4), a capacitor (C0), an adjustment winding (T2) and an electrolytic capacitor (E2); one end of the electrolytic capacitor (E1) is respectively connected with a drain of the switching transistor (Q3) and one end of a first primary coil in the adjustment winding (T2); the other end of the first primary coil in the adjustment winding (T2) is connected with one end of the capacitor (C0); the other end of the capacitor (C0) is connected with a source of the switching transistor (Q3); a gate of the switching transistor (Q3) is connected with an output end (OUT1) of the LLC control chip through a resistor (R9); the other end of the electrolytic capacitor E1 is connected with a drain of the switching transistor (Q4); a source of the switching transistor (Q4) is respectively connected with the other end of the capacitor (C0) and an output end (QUT2) of the LLC control chip; a gate of the switching transistor (Q4) is connected with an output end (QUT3) of the LLC control chip through a resistor (R10); one end of a second primary coil in the adjustment winding (T2) is connected with a positive pole of a diode (D6); the other end of the second primary coil in the adjustment winding (T2) is connected with one end of the capacitor (C2); a negative pole of the diode (D6) and the other end of the capacitor (C2) are respectively connected with a power end;

one end of a first secondary coil in the adjustment winding (T2) is connected with a positive pole of a diode (D4); the other end of the first secondary coil in the adjustment winding (T2) is connected with a positive pole of a diode (D5); an adjustment end of the first secondary coil in the adjustment winding (T2) is connected with one end of the electrolytic capacitor (E2); the other end of the electrolytic capacitor (E2) is respectively connected with a negative pole of the diode (D4) and a negative pole of the diode (D5); a positive power input end of the LED lamp source array is connected with the other end of the electrolytic capacitor (E2); and a negative power input end of the LED lamp source array is connected with one end of the electrolytic capacitor (E2).

8. The LED drive power supply according to claim 6, wherein the LLC control chip adopts an LLC control chip (L6599NCP1399).

9. The LED drive power supply according to claim 6, wherein the LED voltage/current sampling circuit adopts an operational amplification type voltage/current sampling circuit; and the optically coupled isolator (U2) adopts an optically coupled isolator (OPTOISO1).

* * * * *